A. MILLOCHAU.
Distillation of Petroleum.
No. 53,167.
Patented March 13, 1866.
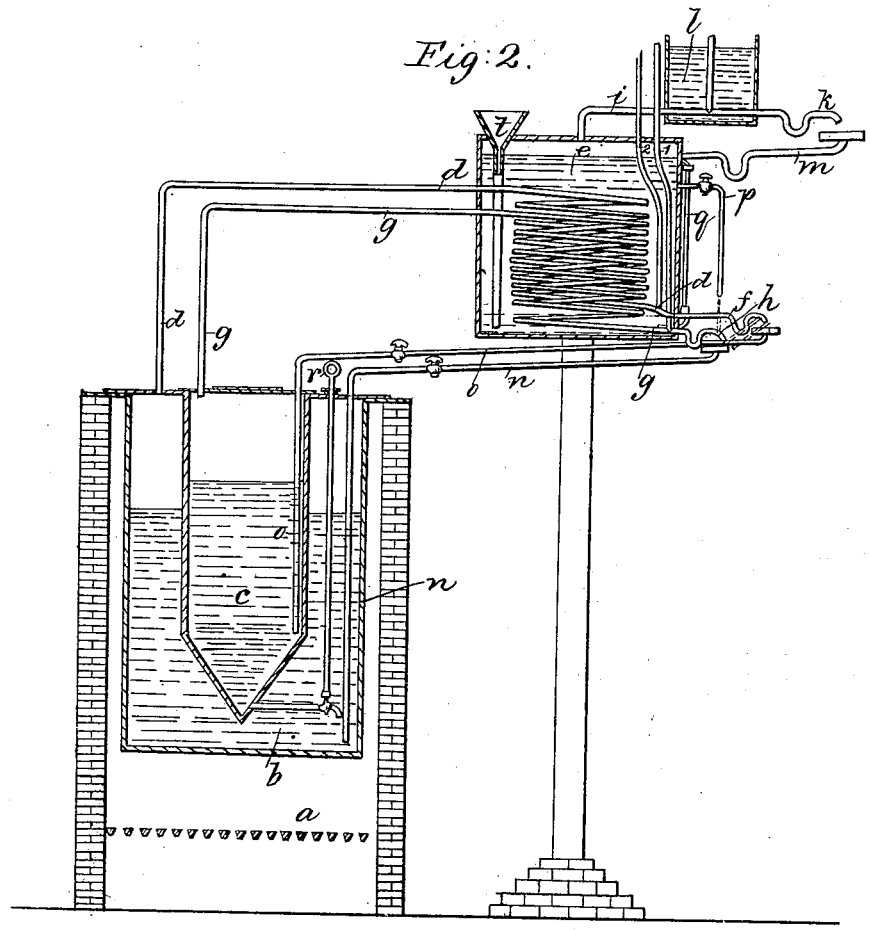
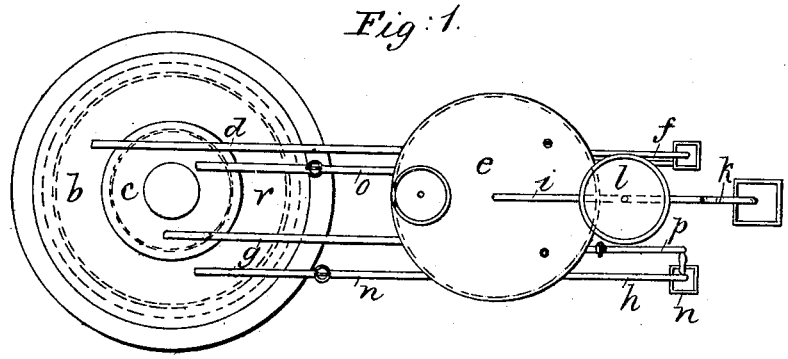
Witnesses.
Inventor

UNITED STATES PATENT OFFICE.

ADOLPH MILLOCHAU, OF NEW YORK, N. Y.

IMPROVEMENT IN DISTILLATION OF PETROLEUM.

Specification forming part of Letters Patent No. 53,167, dated March 13, 1866.

*To all whom it may concern:*

Be it known that I, ADOLPH MILLOCHAU, of the city and State of New York, have invented, made, and applied to use a certain new and useful Improvement in the Distillation of Petroleum and Similar Oils; and I do hereby declare the following to be a full, clear, and exact description of the said invention, reference being had to the annexed drawings, making part of this specification, wherein—

Figure 1 is a plan of the apparatus employed by me, and Fig. 2 is a vertical section of the same.

Similar marks of reference denote the same parts.

In Letters Patent granted to me March 21, 1865, a mode of distilling petroleum is set forth. The present invention relates to a mode of distillation in which a similar still to that shown in said Letters Patent is employed; but by my present invention the benzine and easily-evaporated materials are distilled from the crude oil previous to its introduction into the still by the heat evolved in the condensation of the heavier or burning oils.

In the drawings, $a$ is a fire-chamber, in which is placed the still $b$ and inner or second still, $c$, as in aforesaid patent.

$d$ is a pipe from the still $b$, extending as a worm or condenser through the vat $e$ to the delivery-neck $f$, and $g$ is a pipe from the still $c$ through the vat $e$, terminating at the delivery-neck $h$. 1 and 2 are upright vents for the gases that will not condense in $d$ and $g$.

The vessel $e$ is covered, and is to contain crude oil, and $i$ is a pipe passing through a tub or condenser, $l$, to the neck $k$. $m$ is a pipe under $k$, leading back into the vessel $e$.

$n$ is a pipe leading to the bottom or lower part of the still $b$, and $o$ a similar pipe to the still $e$.

The vessel $e$ should be of a capacity to hold considerable more than the charge to the still $b$, and a charge of crude oil is introduced in the still $b$, and the vessel $e$ also filled. The fire is started, the vapors pass over from $b$ through $d$, and are condensed by $e$, and returned through the pipe or neck $f$ and a movable trough (see dotted lines, Fig. 2) and the pipe $n$ to the still $b$. This is done until the benzine and easily-evaporated materials are distilled, or these may be conveyed away to a receptacle until oil of the required gravity is distilled, which is allowed to run into the inner still, $c$, through the pipe $o$, and thence vaporized by the heat of the still $b$, and the vapors condensed by $e$, and the product returned by pipe $n$ into still $b$ until a burning-oil of the proper gravity is distilled, which is taken away to a suitable receptacle, the same as in aforesaid Letters Patent.

During the foregoing operations the crude oil in the vessel $e$ has become heated by the condensation of the vapors in the coils $d$ and $g$, and the benzine and other easily-evaporated materials have been passing off by the pipe $i$ and been condensed and returned to the vessel $e$, which repeated distillation of the benzine reduces its gravity so that it becomes less volatile, and the product of distillation from this vessel $e$ may be conveyed away to a receptacle at any desired stage of the process. It must, however, be conveyed away before the commencement of the next operation.

After the burning-oil has commenced to run from the neck or pipe $h$, and when the oil in the still $b$ has been distilled down to any desired level, the cock $p$ is to be opened and the oil run away from the vessel $e$ through the pipe $n$ into the still $b$, the burning-oil being conveyed away from $h$ by a spout to a suitable receptacle.

The amount of crude oil running into the still $b$ in this manner is to be about the same as of the burning-oil escaping from the neck or pipe $g$, in order that the oil may remain nearly at the same level in the stills during the operations, and to cause the delivery of the oil from the vessel $e$ and maintain the necessary condensing-liquid. I cause water to run into the funnel $t$, which displaces the oil, causing it to rise.

A glass gage may be provided, as at $q$, to observe the level of the oil and water, in order that the exit of oil may be stopped before any water passes with it into the still.

During the distillation the amount of oil remaining in the outer still, $b$, may be too little to heat the inner still, $c$. If that is the case, I turn the key $r$, which opens the cock $s$ and allows the oil to run from the still $c$ into the still $b$, and then I proceed with the distillation, as before; or at the end of distilling the charge the oil from the inner still may be allowed to run out and be redistilled with the crude oil introduced into the still $b$ for another charge.

I make use of a conical bottom to the still $c$, as represented, in order that the lower end may come down toward the lower and hotter portions of the still $b$, and thus increase the efficiency of said still $c$.

By the various distillations aforesaid but little waste occurs, and the percentage of burning-oil obtained is much larger than heretofore, and the evaporation of the benzine by the heated vapors that pass off and are condensed facilitates the general operation, saving time and fuel, and resulting in the crude oil being in a condition for immediate distillation in the double still.

What I claim, and desire to secure by Letters Patent, is—

1. The method herein specified of preparing crude oil for distillation by evaporating the benzine and other volatile substances by a coil of pipe containing heated vapors and returning the condensed benzine into the crude oil, as specified.

2. Supplying the crude or partially-crude petroleum in a heated state from a vessel, $e$, containing the same, to the outer still, $b$, and passing the condensed products of the still $b$ back into the inner still, $c$, for the purposes and substantially as specified.

3. The cock $s$ or its equivalent, in combination with the stills $b$ and $c$, for the purposes set forth.

4. The vessel $e$ for containing crude oil, in combination with the stills $b$ and $c$ and condensing-pipes $d$ and $g$, for the purposes and as set forth.

5. The conical bottom to the inner still, applied as and for the purposes set forth.

In witness whereof I have hereunto set my signature this 7th day of October, A. D. 1865.

AD. MILLOCHAU.

Witnesses:
LEMUEL W. SERRELL,
GEO. D. WALKER.